(12) United States Patent
Kuroyanagi et al.

(10) Patent No.: US 7,234,650 B2
(45) Date of Patent: Jun. 26, 2007

(54) THREE-WAY VALVE AND FUEL INJECTION DEVICE HAVING THE SAME

(75) Inventors: Masatoshi Kuroyanagi, Kariya (JP); Koichi Chika, Kariya (JP)

(73) Assignee: DENSO Corporation, Kariya, Aichi-pref. (JP)

( * ) Notice: Subject to any disclaimer, the term of this patent is extended or adjusted under 35 U.S.C. 154(b) by 369 days.

(21) Appl. No.: 10/947,439

(22) Filed: Sep. 23, 2004

(65) Prior Publication Data

US 2005/0098652 A1    May 12, 2005

(30) Foreign Application Priority Data

Nov. 10, 2003  (JP)  ............................. 2003-379566

(51) Int. Cl.
*B05B 1/08*  (2006.01)
(52) U.S. Cl. ........................ 239/102.2; 239/88; 239/96; 239/533.2; 239/585.1; 123/447; 123/498; 251/129.06; 251/50
(58) Field of Classification Search ............. 239/102.1, 239/102.2, 88, 89, 90, 91, 124, 95, 533.2, 239/585.1, 569; 251/50, 53, 281; 123/446, 123/467
See application file for complete search history.

(56) References Cited

U.S. PATENT DOCUMENTS 6,994,272 B2 * 2/2006 Kurrle et al. ................. 239/96

2003/0019960 A1 * 1/2003 Magel ..................... 239/585.5

FOREIGN PATENT DOCUMENTS

| DE | 19803910 A1 | 11/1998 |
| DE | 10257140 A1 | 6/2003 |
| EP | 0816670 A1 | 1/1998 |
| JP | 2003-148277 | 5/2003 |
| JP | 2004-176656 | 6/2004 |
| WO | WO 00/23704 | 4/2000 |
| WO | WO 01/29395 A2 | 4/2001 |
| WO | WO 03/044359 A1 | 5/2003 |

OTHER PUBLICATIONS

French Search Report—Dec. 19, 2005.

* cited by examiner

*Primary Examiner*—Dinh Q. Nguyen
(74) *Attorney, Agent, or Firm*—Nixon & Vanderhye P.C.

(57) ABSTRACT

A three-way valve having a valve chamber with a low-pressure port, a high-pressure port, and a control port is provided. The three-way valve also has a control valve installed in the valve chamber for closing one of the low-pressure port and the high-pressure port. A guide hole communicates with the valve chamber via the high-pressure port. A guide portion is slidably installed in the guide hole and moves together with the control valve. The guide portion further receives a fuel pressure at the high-pressure port in a closing direction of the high-pressure port. The control valve is driven by a piezoelectric actuator to open the low-pressure port and close the high-pressure port. The valve chamber communicates with an oil-accumulating chamber via a by-pass conduit. The oil-accumulating chamber is defined within the guide hole and is located opposite the guide portion from the valve chamber.

8 Claims, 7 Drawing Sheets

THREE-WAY VALVE AND FUEL INJECTION DEVICE HAVING THE SAME

CROSS REFERENCE TO RELATED APPLICATIONS

This application is based upon and claims the benefit of priority of Japanese Patent Application No. 2003-379566 filed on Nov. 10, 2003, the contents of which are incorporated herein by reference.

FIELD OF THE INVENTION

The present invention relates to a three-way valve driven by a piezoelectric actuator for selectively controlling communication between a port that is connected to an oil-pressure control chamber and one of a high-pressure port and a low-pressure port and a fuel injection valve implementing the same.

BACKGROUND OF THE INVENTION

Diesel engines include fuel injection valves for high injecting high-pressure fuel into combustion chambers.

FIG. 6 depicts one type of fuel injection valve "A," as disclosed in JP2003-148277A (hereinafter referred to as "Reference 1"). The fuel injection valve "A" includes a nozzle portion 120, a backpressure chamber 130, a valve chamber 140, a control valve 170, and an actuator 180. The nozzle portion 120 includes an injector 110 and a nozzle needle 100. The nozzle needle 100 is operable to open and close the injector 110. The backpressure chamber 130 is adapted to accumulate high-pressure fuel, which urges the nozzle needle 100 in a nozzle-closing direction toward the injector 110. The valve chamber 140 communicates with the backpressure chamber 130, a low-pressure conduit 150, and a high-pressure conduit 160. The control valve 170 is installed in the valve chamber 140 and is operable to selectively interrupt communication between the valve chamber 140 and the low-pressure and high-pressure conduits 150, 160. The actuator 180 is operable to drive the control valve 170.

The actuator 180 includes a piezoelectric actuator 180. The piezoelectric actuator 180 includes a plurality of laminated piezoelectric devices that extend or retract in response to a charging voltage. The extension or retraction of the piezoelectric devices is transmitted to the control valve 170 via a first piston 200 disposed in an oil-tight chamber 190 and a second piston 210.

The valve chamber 140 containing the control valve 170 includes a low-pressure port 220 and a high-pressure port 230. The low-pressure port 220 communicates with the low-pressure conduit 150. The high-pressure port 230 communicates with the high-pressure conduit 160. The control valve 170 is operable to close one of the low-pressure port 220 and the high-pressure port 230.

When the control valve 170 closes the high-pressure port 230, it opens the low-pressure port 220. When the low-pressure port 220 opens, the backpressure chamber 130 freely communicates with the low-pressure conduit 150 via the valve chamber 140. This decreases the fuel pressure in the backpressure chamber 130 allowing the nozzle needle 100 to move toward the backpressure chamber 130 away from the injector 110 and, thus, allowing fuel to travel through the injector 110 from the high-pressure conduit 160. Alternatively, if the control valve 170 closes the low-pressure port 220, the communication between the backpressure chamber 130 and the low-pressure conduit 150 terminates. The fuel pressure in the backpressure chamber 130 increases and the nozzle needle 100 moves in the valve-closing direction to close the injector 110.

Accordingly, to open the low-pressure port 220 and close the high-pressure port 230, the actuator 180 must force the control valve 170 downward against the strength of the high-pressure fuel contained in the valve chamber 140. The piezoelectric actuator 180 requires a high charging voltage to achieve this, as indicated by the dashed line in FIG. 3. With continued reference to FIG. 3, the shaded circle indicates the load required for the piezoelectric actuator 180 to move the control valve 170 to open the low-pressure port 220. The shaded square indicates the load required for the piezoelectric actuator 180 to move the control valve 170 to close the high-pressure port 230. Thus, it should be understood that the fuel injection valve "A" requires a larger output strength and displacement to close the high-pressure port 230 than to simply open the low-pressure port 220.

FIG. 7 depicts a fuel injection valve "B" as disclosed in Japanese Patent Application No. 2002-345588, hereinafter referred to as "Reference 2." It is important to note that fuel injection valve "B" was disclosed in JP2004-176656A on Jun. 24, 2004, which is subsequent to the filing date of Japanese Patent Application No. 2003-379566, to which this application is based upon and claims the benefit of priority. Fuel injection valve "B" is similar to the fuel injection valve "A" described above with the exception that the control valve 170 is equipped with a pressure-balancing valve comprising a guide portion 240 disposed in a guide hole 250. The guide portion 240 operates to cancel the high-pressure of the fuel acting on the control valve 170 while the control valve 170 opens the low-pressure port 220 and closes the high-pressure port 230.

The guide portion 240 is connected to and moves with the control valve 170. The fuel pressure acting on the guide portion 240 urges the control valve 170 downward. This balances the fuel pressure urging on the control valve 170 upward. Therefore, the fuel injection valve "B" requires less strength to close the high-pressure port 230.

The guide portion 240 is installed for sliding displacement in the guide hole 250. The guide hole 250 fluidly communicates with the low-pressure conduit 150 via a connecting conduit 260 such that a low-pressure acts on the bottom of the guide portion 240. This low-pressure reduces the strength required to open the low-pressure port 220 to a value that is smaller than that required of the fuel injection valve "A" disclosed in Reference 1. FIG. 3 depicts the load required to open the low-pressure port 220 (identified by the empty circle), the load required to close the high-pressure port 230 (identified by the empty square), and the charging voltage required by the piezoelectric actuator 180 of the fuel injection valve "B" (identified by the solid line).

However, the fuel injection valve "B" disclosed in Reference 2 includes some potential for operating deficiencies. As stated above, the lower end of the guide hole 250 is connected to the low-pressure conduit 150 via the connecting conduit 260. This creates a difference in fuel pressure between the top and bottom sides of the guide portion 240. This difference in fuel pressure can cause fuel leakage through any clearance provided between the guide portion 240 and the guide hole 250.

Furthermore, it should be noted that the guide portion 240 axially and radially supports the control valve 170. The guide hole 250 maintains the radial disposition of the control valve 170 by slidably supporting the guide portion 240. Therefore, if the valve seat of the low-pressure port 220 is conically shaped, any error in the coaxial alignment between the low-pressure port 220 and the guide hole 250 will increase uneven wearing of the guide portion 240 and/or the guide hole 250, thereby increasing the fuel leakage described above. Alternatively, if the valve seat of the low-pressure port 220 includes a flat surface, any error in the angle of the flat surface relative to the axis of the guide hole 250 will decrease the seating quality of the control valve 170 against the low-pressure port 220.

SUMMARY OF THE INVENTION

An object of the present invention is to provide a three-way valve driven by a piezoelectric actuator and operable to prevent fuel leakage at a sliding clearance of the valve when a control valve closes a low-pressure port and a fuel injection valve having the same.

Another object of the present invention is to provide a three-way valve driven by a piezoelectric actuator having improved seating quality between the control valve and the low-pressure port.

The present invention provides a three-way valve driven by a piezoelectric actuator including a valve chamber, a control valve, a guide hole, and a guide portion. The valve chamber includes a low-pressure port, a high-pressure port, and a control port. The low-pressure port communicates with a low-pressure conduit. The high-pressure port communicates with a high-pressure conduit. The control port communicates with a pressure-controlling chamber. The control valve is installed in the valve chamber. The control valve is operable to selectively close one of the low-pressure port and the high-pressure port. The guide hole communicates with the valve chamber via the high-pressure port.

The guide portion is slidably installed in the guide hole. The guide portion is connected to and movable together with the control valve and receives a fuel pressure at the high-pressure port in a valve-closing direction of the high-pressure port.

An actuator having a piezoelectric device drives the control valve to open the low-pressure port and close the high-pressure port. The valve chamber communicates with an oil-accumulating chamber via a by-pass conduit. The oil-accumulating chamber is defined by a space in the guide hole separated by the guide portion at an opposite side of the valve chamber.

A fuel injection valve of the present invention includes the three-way valve described above, an injection portion, and a nozzle needle. The injection portion includes a nozzle hole for injecting fuel. The nozzle needle opens and closes the nozzle hole. The nozzle needle is naturally urged toward a closing direction of the nozzle hole by the fuel pressure in the pressure-controlling chamber.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Figure 1:
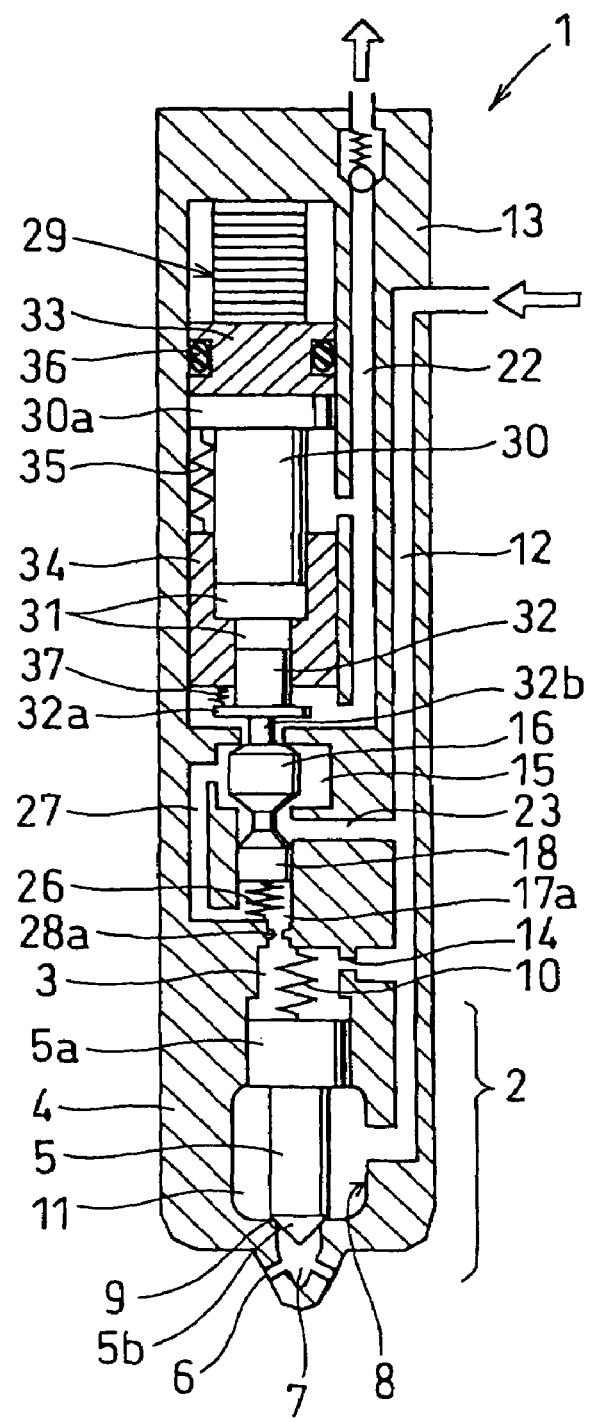
FIG. 1 is a cross-sectional view of a fuel injection valve according to a first embodiment of the present invention.
Figure 2:
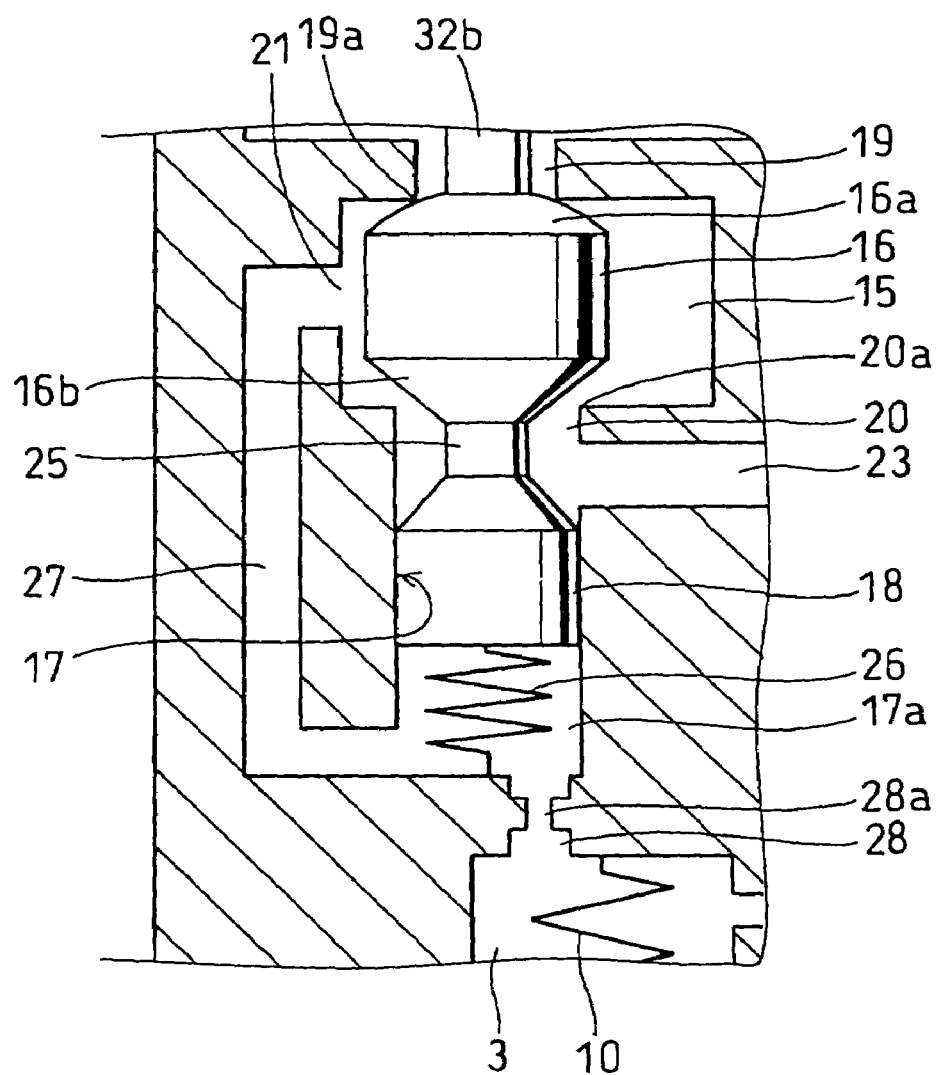
FIG. 2 is a cross-sectional view of a backpressure control portion of the fuel injection valve according to the first embodiment of the present invention.
Figure 3:
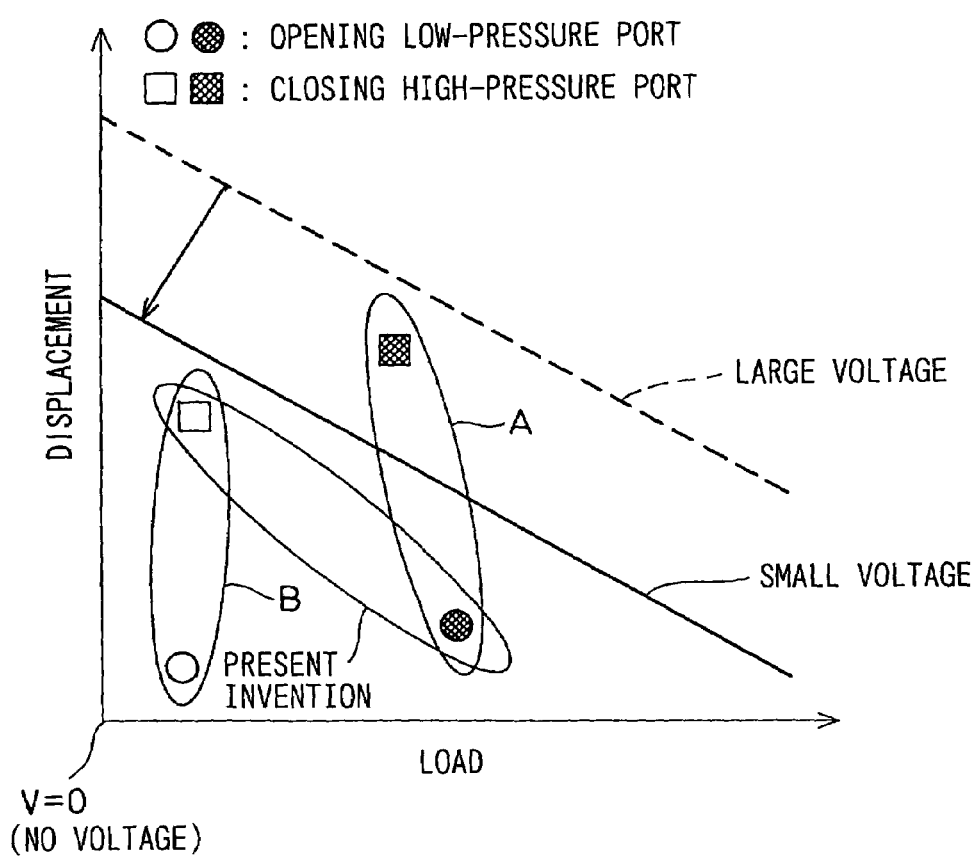
FIG. 3 is a graph illustrating relative load-displacement relationships required by piezoelectric actuators implemented in fuel injection valves according to the first embodiment of present invention, a prior art embodiment, and a related art embodiment.

A first embodiment of the present invention is described herein with reference to FIGS. 1 to 3.

First Embodiment

FIG. 1 shows an entire section of a fuel injection valve 1 having a three-way piezoelectric-control valve in accordance with the principles of the present invention.

The fuel injection valve 1 of this embodiment is adapted for an accumulated fuel injection system of a diesel engine. One fuel injection valve 1 is positioned in each cylinder of the engine, which is supplied with high-pressure fuel from a common rail or fuel accumulation vessel.

The fuel injection valve 1 is provided with an injection portion 2, a backpressure chamber (a pressure-controlling chamber) 3, a backpressure control portion X, an actuator X, and so on X.

The injection portion 2 includes a nozzle body 4 and a nozzle needle 5. The nozzle body 4 includes an injection hole 6, a sac 7, an axial cavity 8, and a nozzle seat 9. The injection hole 6 is adapted to inject a fuel. The injection hole 6 and the axial cavity 8 are in fluid communication via the sac 7. The nozzle seat 9 is disposed near an opening circumference of the sac 7 adjacent to the axial cavity 8. A tip of the nozzle needle 5 is adapted to engage the nozzle seat 9, as illustrated in FIG. 1.

The nozzle needle 5 is formed to include a slider 5a that slides on and is guided by an internal circumference of the axial cavity 8. A spring 10 is disposed between an end wall of the axial cavity 8 and the slider 5a of the nozzle needle 5. The spring 10 biases the nozzle needle 5 toward the injection hole 6.

The axial cavity 8 defines a ring-shaped fuel accumulator 11 surrounding the nozzle needle 5. The fuel accumulator 11 is disposed axially between the slider 5a and the sac 7. A high-pressure conduit 12 supplies high-pressure fuel to the fuel accumulator 11 from a common rail. The high-pressure conduit 12 is formed in a housing 13 of the fuel injection valve 1 and in the nozzle body 4. In FIG. 1, the nozzle body 4 and the housing 13 are formed from a single body.

The nozzle needle 5 includes a cone-shaped valve head 5b. The valve head 5b engages the nozzle seat 9 and closes the opening of the sac 7 to the axial cavity 8. This separates the sac 7 from the fuel accumulator 11.

The sliding engagement between the slider 5a and the internal circumference of the axial cavity 8 partitions the backpressure chamber 3 at an opposite side of the fuel accumulator 11 from the sac 7. The backpressure chamber 3 communicates with the high-pressure conduit 12 via an orifice 14. Fuel pressure in the backpressure chamber 3, as well as the spring 10, act on the slider 5a to bias the needle 5 toward the sac 7.

FIG. 2 depicts a backpressure control portion of the fuel injection valve 1 having a valve chamber 15, a control valve 16, a guide hole 17, and a guide portion 18. The valve chamber 15 communicates with the backpressure chamber 3. The valve chamber 15 slidably supports the control valve 16. The guide hole 17 communicates with the valve chamber 15. The guide hole 17 slidably supports the guide portion 18.

The valve chamber 15 includes a low-pressure port 19, a high-pressure port 20, and a control port 21.

The low-pressure port 19 provides fluid communication between an axial end of the valve chamber 15 and a low-pressure conduit 22 (shown in FIG. 1) formed in the housing 13. The low-pressure conduit 22 further communicates with a return conduit that leads excess fuel to a fuel tank.

The high-pressure port 20 provides fluid communication between an axial end of the valve chamber 15 that is opposite the low-pressure port 19 and the high-pressure conduit 12 formed in the housing via a branch conduit 23. The low-pressure port 19 and the high-pressure port 20 are coaxially arranged. As shown in FIGS. 1 and 2, the low-pressure port 19 is formed in the housing 13 directly above the high-pressure port 20.

The control port 21 provides fluid communication between a circumferential wall of the valve chamber 15 and the backpressure chamber 3 via a fuel conduit, which will be described in more detail below.

The control valve 16 includes a low-pressure valve head 16a and a high-pressure valve head 16b. The low-pressure valve head 16a closes the low-pressure port 19 by engaging a low-pressure valve seat 19a disposed in the valve chamber 15. The high-pressure valve head 16b closes the high-pressure port 20 by engaging a high-pressure valve seat 20a disposed in the valve chamber 15. Therefore, it should be appreciated that the control valve 16 travels between a position where the low-pressure valve head 16a closes the low-pressure port 19 (as shown in FIG. 2) and a position where the high-pressure valve head 16b closes the high-pressure port 20.

The guide hole 17 is disposed opposite the high-pressure port 20 from the low-pressure port 19. The guide hole 17 is generally an extension of the high-pressure port 20. Therefore, the guide hole 17, the high-pressure port 20, and the high-pressure valve seat 20a all include generally equivalent diameters.

The guide portion 18 includes a cylindrical shape that is integrally formed with a connecting portion 25 and the control valve 16. The guide portion 18 is inserted in the guide hole 17 with a slight clearance.

The connecting portion 25 includes a cylindrical shape having a diameter that is smaller than the diameter of either the control valve 16 or the guide portion 18. The connecting portion 25 extends through the high-pressure port 20 and rigidly connects the control valve 16 to the guide portion 18. Accordingly, the high-pressure port 20 defines a ring-shaped space around the connecting portion 25. This high-pressure conduit 12 supplies high-pressure fuel to this ring-shaped space via the branch conduit 23.

The guide hole 17 includes an oil-accumulating chamber 17a disposed between the guide portion 18 and end wall thereof that is opposite the high-pressure port 20. The oil-accumulating chamber 17a contains a spring 26. The spring 26 biases the guide portion 18 and, therefore, the control valve 16 toward the low-pressure port 19 (upward in FIG. 2).

The oil-accumulating chamber 17a communicates with the valve chamber 15 through a by-pass conduit 27 and with the backpressure chamber 3 through a connecting conduit 28 having an orifice 28a. The fuel conduit described above is composed of the by-pass conduit 27, the connecting conduit 28, and the oil-accumulating chamber 17a.

Referring back to FIG. 1, the actuator includes a piezostack 29, a large-diameter piston 30, a small-diameter piston 32, and an oil-tight chamber 31. The piezostack 29 includes a plurality of laminated piezoelectric devices. The large-diameter piston 30 is adapted to move according to a displacement generated by the piezostack 29. The small-diameter piston 32 is coaxially aligned with the large-diameter piston 30. The oil-tight chamber 31 provides an operative link between the large-diameter piston 30 and the small-diameter piston 32.

The piezostack 29 is installed in the upper portion of the housing 13, as shown in FIG. 1. Upon receiving an electrical charge by a driving circuit, the piezostack 29 expands in the laminating direction (the vertical direction in FIG. 1) and generates an output force upon the large-diameter piston 30. Upon cessation of the electrical charge, the piezostack 29 retracts and reduces the output force.

A spacer 33 is disposed between the large-diameter piston 30 and the piezostack 29. A large-diameter bore formed in one side of a cylinder block 34 slidably supports the large-diameter piston 30. A spring 35 installed between a flange portion 30a of the large-diameter cylinder 30 and the cylinder block 34 biases the piezostack 29 (upwards in FIG. 1).

A sealer 36 such as a ring-shaped sealer is provided around the spacer 33 to prevent fuel from leaking toward the piezostack 29.

The small-diameter piston 32 is inserted in and slidably held by a small-diameter bore formed in the cylinder block 34 opposite the large-diameter bore. A spring 37 installed between a flange portion 32a of the small-diameter piston 32 and the cylinder block 34 biases the small-diameter piston 32 toward the control valve 16 (downwards in FIG. 1). A pin 32b extends downward from the flange portion 32a and contacts the control valve 16.

Internal circumferential walls of the bores and ends of the large-diameter piston 30 and the small diameter piston 32 define the oil-tight chamber 31.

The operation of the fuel injection valve 1 in the present embodiment is now described.

When the piezostack 29 is not charged, the control valve 16 is biased upward by the spring 26. The low-pressure valve head 16a engages the low-pressure valve seat 19a to close the low-pressure port 19. This blocks communication between the backpressure chamber 3 and the low-pressure conduit 22. Therefore, fuel pressure in the backpressure chamber 3 increases and fuel leakage does not occur. The valve head 5b of the nozzle needle 5 engages the nozzle seat 9 to close the injection hole 6.

Upon charging the piezostack 29, it expands and forces the large-diameter piston 30 downward in the large-diameter bore. This pressurizes the fuel in the oil-tight chamber 31 and forces the small-diameter piston 32 downward in the small-diameter bore. The displacement of the small-diameter piston 32 is transmitted to the control valve 16 via the pin 32a. The control valve 16 displaces downward in the valve chamber 15. Accordingly, the low-pressure valve head 16a disengages from the low-pressure valve seat 19a to open the low-pressure port 19. The high-pressure valve head 16b engages the high-pressure valve seat 20*a* and closes the high-pressure port 20. This enables fuel in the backpressure chamber 3 to flow to the low-pressure conduit 22.

Additionally, high-pressure fuel from the high-pressure conduit 12 flows into the backpressure chamber 3 through the orifice 14. However, the amount of fuel flowing into the backpressure chamber 3 is less than the amount flowing out. Therefore, the fuel pressure in the backpressure chamber 3 gradually decreases. Eventually, the fuel pressure in the fuel accumulator 11 overcomes the summed forces provided by the decreased fuel pressure in the backpressure chamber 3 and the bias of the spring 10. Once this occurs, the fuel pressure in the fuel accumulator 11 urges the nozzle needle 5 away from the nozzle seat 9. The nozzle needle 5 then moves upward in the axial hole 8 and the sac 7 opens to communicate with the fuel accumulator 11. Finally, the high-pressure fuel flows through the sac 7 and out the injection hole 6 to a combustion chamber of a diesel engine.

Upon discharging the piezostack 29, it retracts and the large-diameter piston 30 is forced upward by the spring 35. The fuel pressure in the oil-tight chamber 31 decreases and the downward force on the control valve 16 decreases. Accordingly, the spring 26 forces the control valve 16 upward to open the high-pressure port 20 and close the low-pressure port 19. This terminates communication between the backpressure chamber 3 and the low-pressure conduit 22. The fuel pressure in the backpressure chamber 3 increases and the nozzle needle 5 is forced downward in the axial cavity 8. The valve head 5*b* of the nozzle needle 5 reengages the nozzle seat 9 and fuel injection ceases.

It should therefore be appreciated that the fuel injection valve 1 of the first embodiment adopts a pressure-balancing three-way valve, wherein fuel pressure acting upwardly on the control valve 16 is cancelled when the control valve 16 opens the low-pressure port 19 and closes the high-pressure port 20. Furthermore, fuel pressure acting on the guide portion 18, which is integrally formed with the control valve 16 and the connecting portion 25, balances fuel pressure acting on the control valve 16.

A pressure-balancing valve similar to that described above generally includes some fuel leakage between the guide hole 17 and the guide portion 18. However in this embodiment, the valve chamber 15 and the oil-accumulating chamber 17*a* communicate via the by-pass conduit 27 to continuously equalize the fuel pressures therein. This pressure equalization prevents fuel from leaking between the guide hole 17 and the guide portion 18 when fuel pressure in the valve chamber 15 is high and the valve head 5*b* engages the nozzle seat 9.

Figure 7:
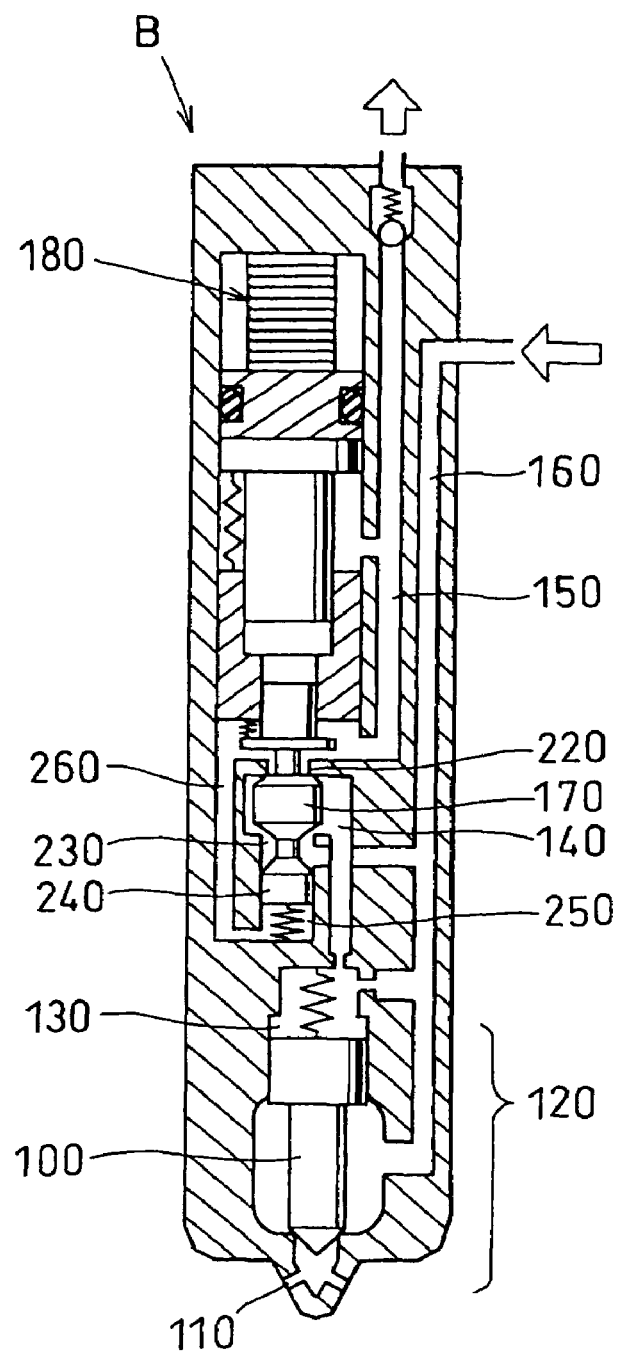
FIG. 7 is a cross-sectional view of a related art fuel injection valve.

It should be noted that the fuel injecting time for the above-described fuel injection valve is approximately $\frac{1}{100}$ to $\frac{1}{30}$ of the non-injecting time. Additionally, the above-described fuel injection valve decreases fuel leakage near the valve-sliding part to 1 to 3% of the fuel leakage occurring in the three-way fuel injection valve shown in FIG. 7.

As described above, the fuel injection valve 1 of the first embodiment includes a pressure-balance valve having a high-pressure valve seat 20*a* and a guide hole 17 of generally equivalent diameters. This enables the fuel pressure in the high-pressure port 20 to apply an upward force to the control valve 16 that is generally equivalent to a downward force applied to the guide portion 18 when the control valve opens the low-pressure port 19 and closes the high-pressure port 20. That is, the fuel pressure applied to the control valve 16 in the upward direction balances the fuel pressure acting on the guide portion 18 in the downward direction. Therefore, as shown in FIG. 3, the load required move the high-pressure valve head 16*b* of the control valve 16 into sealing engagement with the high-pressure valve seat 20*a* decreases to being generally equal to the force required by the three-way valve disclosed in Reference 2 described above (refer to "PRESENT INVENTION" and "B" in FIG. 3). Accordingly, the piezostack 29 for driving the control valve 16 to close the high-pressure port 20 requires less voltage charge. If compared with the fuel injection valve shown in Reference 1 (refer to "A" in FIG. 3) described above, the charging voltage can be reduced from the broken line to the solid line in FIG. 3.

Second Embodiment

Figure 4:
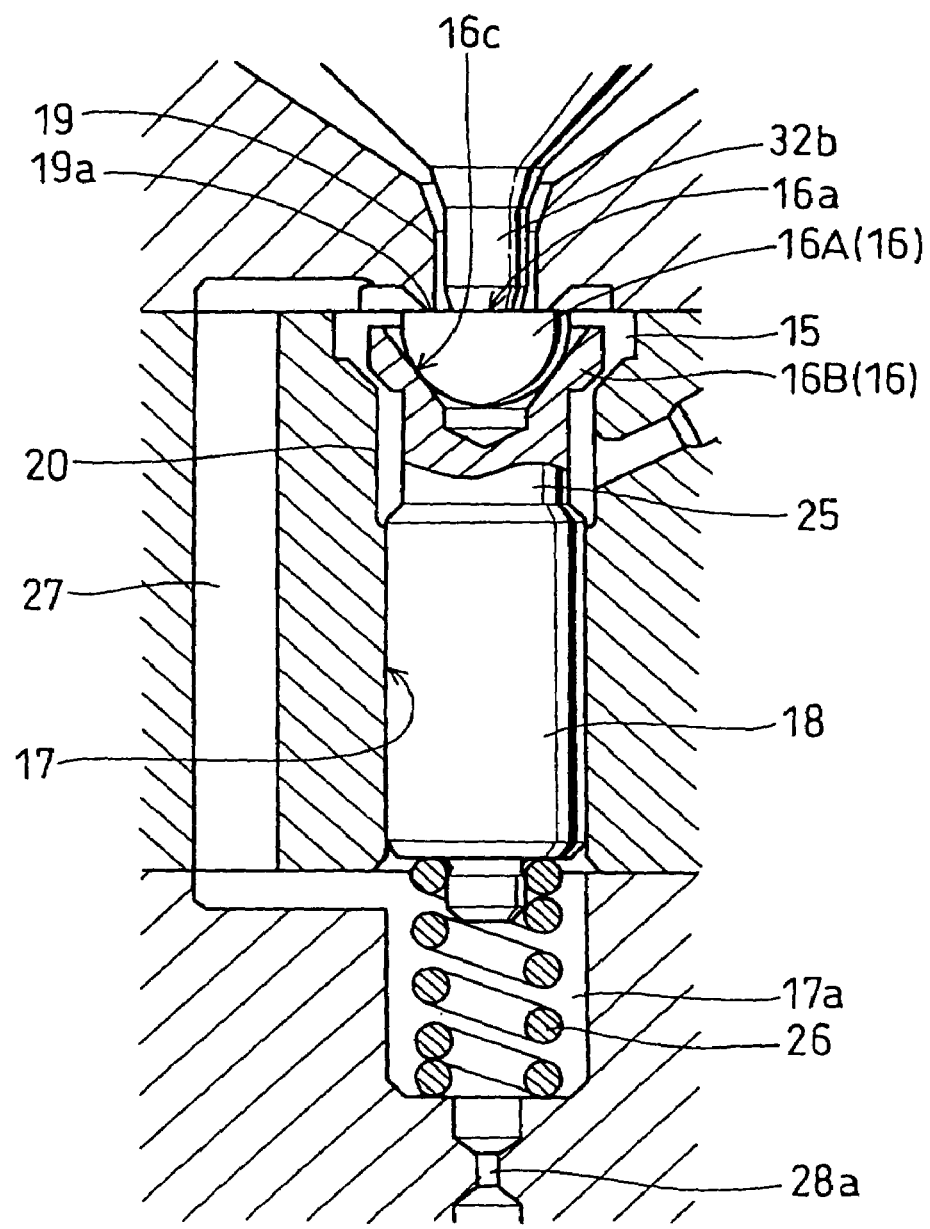
FIG. 4 is a cross-sectional view of a backpressure control portion of a fuel injection valve according to a second embodiment of the present invention.

FIG. 4 depicts a backpressure control portion including a control valve 16 of a second embodiment of a fuel injection valve of the present invention. The control valve 16 includes a low-pressure valve 16A and a high-pressure valve 16B.

The low-pressure valve 16A includes a hemispherical member having a flat surface acting as a low-pressure valve head 16*a*.

The high-pressure valve 16B includes an elongated member having a guide portion 18 and a connecting portion 25, similar to those described above in accordance with the first embodiment. Additionally, however, the high-pressure valve 16B includes a conical surface 16*c* supporting the low-pressure valve 16A.

According to this embodiment, the angle of the low-pressure valve 16A is free from and adjusted against the high-pressure valve 16B. Therefore, even if the angle of the guide hole 17 is not securely perpendicular to the low-pressure valve seat 19*a*, any error corrected through movement of the low-pressure valve 16A. Therefore, the seating quality is improved between the valve head 16*a* of the control valve 16 (the flat surface of the low-pressure valve 16A) and the valve seat 19*a* at the circumference of the low-pressure port 19 to securely close the low-pressure valve.

Figure 5:
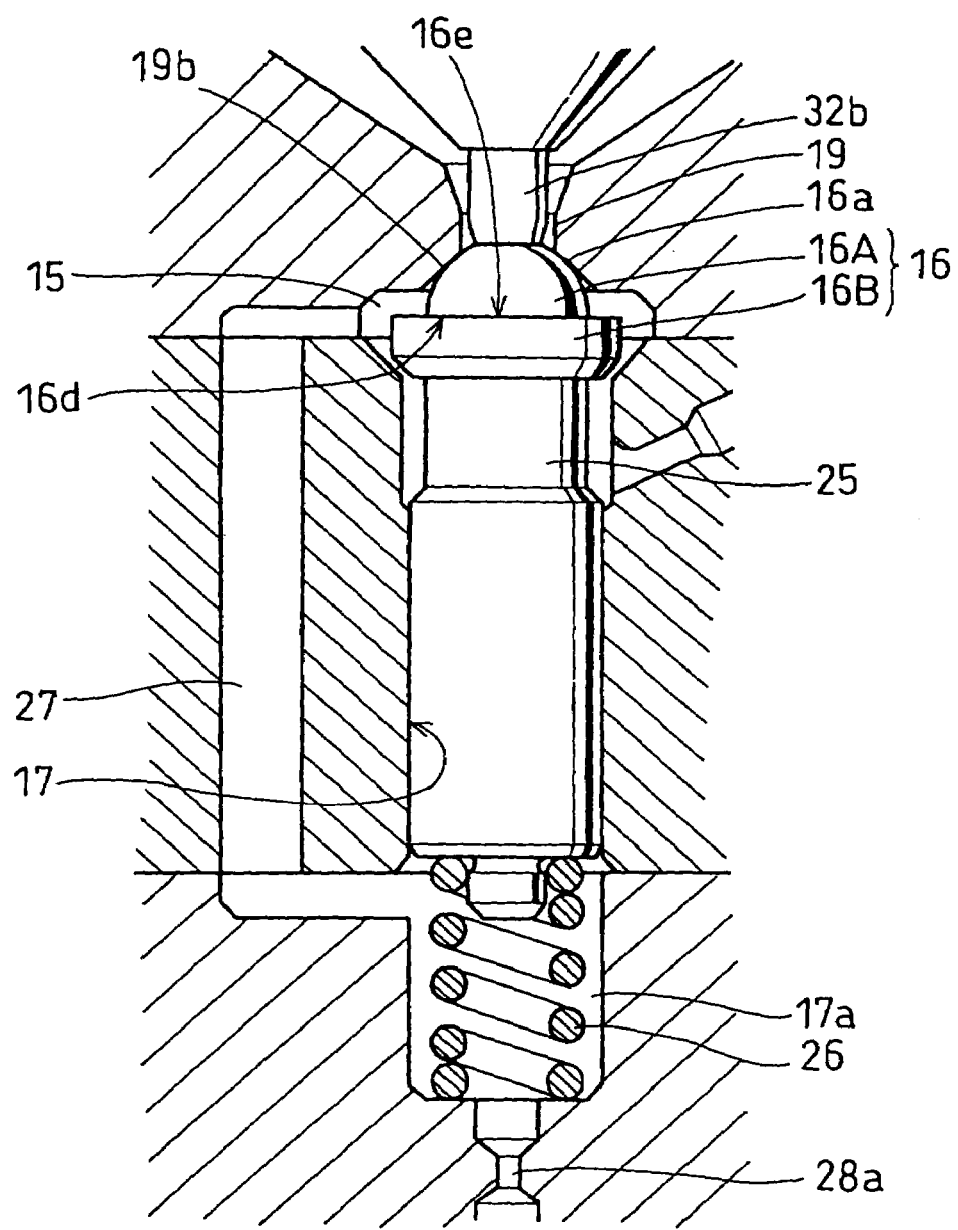
FIG. 5 is a cross-sectional view of a backpressure control portion of a fuel injection valve according to a third embodiment of the present invention.
Figure 6:
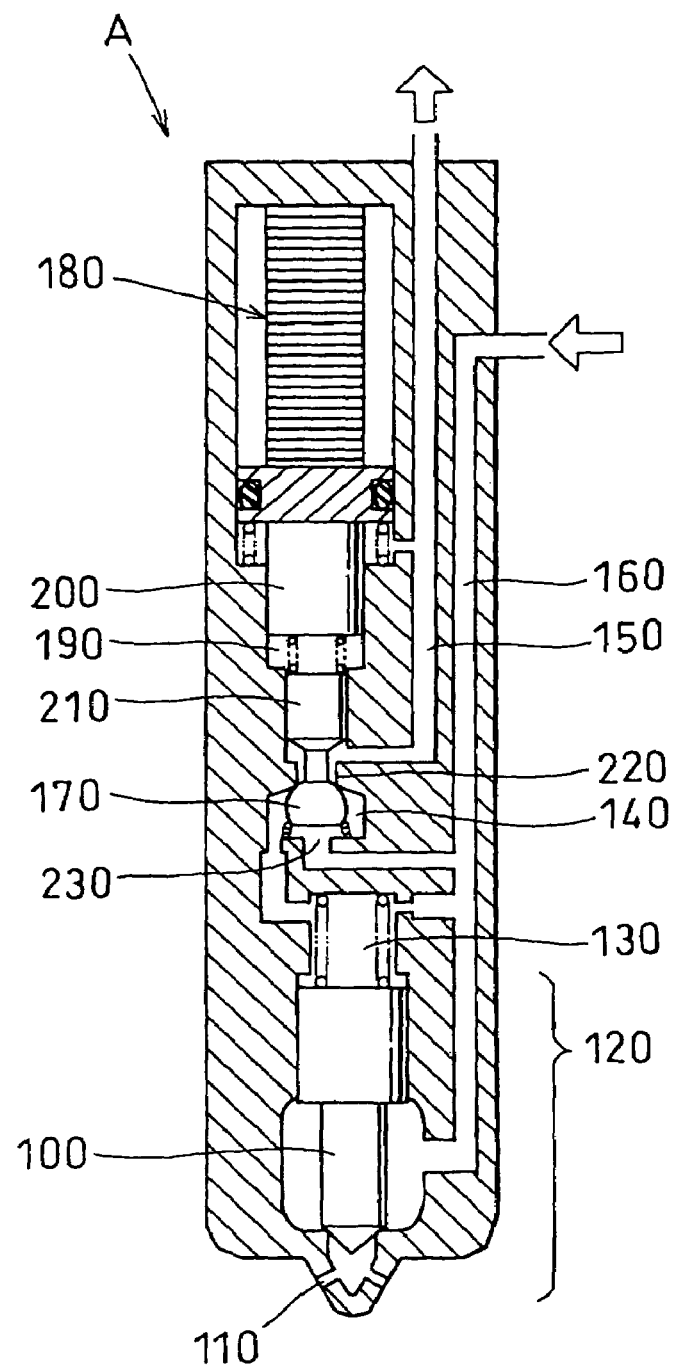
FIG. 6 is a cross-sectional view of a prior art fuel injection valve.

FIG. 5 is a vertical sectional view of the backpressure control portion of a third embodiment of the fuel injection valve. In this embodiment, the control valve 16 is separated into a low-pressure valve 16A and a high-pressure valve 16B, both of which are shaped differently than the corresponding components of the second embodiment described above.

The low-pressure valve 16A is hemispherical in shape and includes a flat surface 16*d*. The spherical surface of the low-pressure valve 16A acts as a low-pressure valve head 16*a*. The opening of the low-pressure port 19 has a conically shaped concave low-pressure valve seat 19*b*, which the valve head 16*a* (the spherical surface) engages.

The high-pressure valve 16B has a flat surface 16*e* which supports the flat surface 16*d* of the low-pressure valve 16A.

According to this embodiment, the low-pressure valve 16A can move laterally (horizontally relative to the view shown in FIG. 5) against the high-pressure valve 16B. Therefore, even if the guide hole 17 is not securely coaxially aligned to the low-pressure port 19, the low-pressure valve 16A may move against the high-pressure valve 16B to correct the alignment. This improves the seating quality between the valve head 16*a* and the valve seat 19*b*.

Furthermore, the angle of the low-pressure valve 16A is free from and adjusted against the high-pressure valve 16B. Therefore, even if the angle of the guide hole 17 is not securely perpendicular to the low-pressure valve seat 19*a* of the low-pressure port 19, the manufacturing error may be corrected by moving the low-pressure valve 16A. This improves the seating quality between the valve head 16a and the valve seat 19b.

In the embodiments described above, the present invention of piezoelectric three-way valve is adopted into a fuel injection valve 1. However, it should be appreciate that the present invention is not limited to being applied to the fuel injection valve 1. The present invention may also be useful in a pressure-control valve of an ABS (Anti-lock Braking System) to control a brake pressure, a pressure-control valve (pressure-adjusting valve, pressure-reducing valve) of an accumulated fuel in a common rail, or some similar device.

What is claimed is:

1. A three-way valve driven by a piezoelectric actuator comprising:
   a valve chamber having a low-pressure port connecting to a low-pressure conduit, a high-pressure port connecting to a high-pressure conduit, and a control port connecting to a pressure-controlling chamber;
   a control valve installed in the valve chamber and closing one of the low-pressure port and the high-pressure port;
   a guide hole communicating with the valve chamber via the high-pressure port;
   a guide portion which is slidably installed in the guide hole and connected to and movable together with the control valve, the guide portion receiving a fuel pressure at the high-pressure port in a valve-closing direction of the high-pressure port;
   an actuator having a piezoelectric device for extending the control valve to open the low-pressure port and close the high-pressure port by transmitting a displacement of the piezoelectric device thereto; and
   a by-pass conduit providing communication between the valve chamber and an oil-accumulating chamber which is defined by a space in the guide hole that is opposite the guide portion from the valve chamber.

2. A three-way valve according to claim 1, wherein a diameter of a valve seat of the high-pressure port and a diameter of the guide hole are substantially equivalent.

3. A three-way valve according to claim 1, wherein the oil-accumulating chamber contains a spring which biases the guide portion and urges the control valve in a valve-closing direction toward the low-pressure port.

4. A three-way valve according to claim 1, further comprising a fuel conduit providing communication between the pressure-controlling chamber and the control port and which has an orifice on the way thereof.

5. A three-way valve according to claim 1, further comprising a fuel conduit which provides communication between the pressure-controlling chamber and the control port, and which is composed of the oil-accumulating chamber, the by-pass conduit, and a connecting conduit having an orifice on the way thereof which provides communication between the oil-accumulating chamber and the pressure-controlling chamber.

6. A three-way valve according to claim 1, wherein the control valve has a low-pressure valve which closes the low-pressure port and a high-pressure valve which closes the high-pressure port.

7. A three-way valve according to claim 1, wherein the control valve has a low-pressure valve shaped generally in a hemisphere with a spherical surface and a flat valve head which closes the low-pressure port at the flat valve head and a high-pressure valve with a conical concave support surface which supports the spherical surface of the low-pressure valve.

8. A three-way valve according to claim 1, wherein the low-pressure port has a conical concave valve seat, and the control valve has a low-pressure valve shaped generally in a hemisphere with a spherical valve head and a flat surface which closes the low-pressure port at the spherical valve head, and a high-pressure valve with a flat support surface which supports the flat surface of the low-pressure valve.

* * * * *